March 31, 1942. K. W. THALHAMMER 2,277,939
LEG REST
Filed Aug. 7, 1939
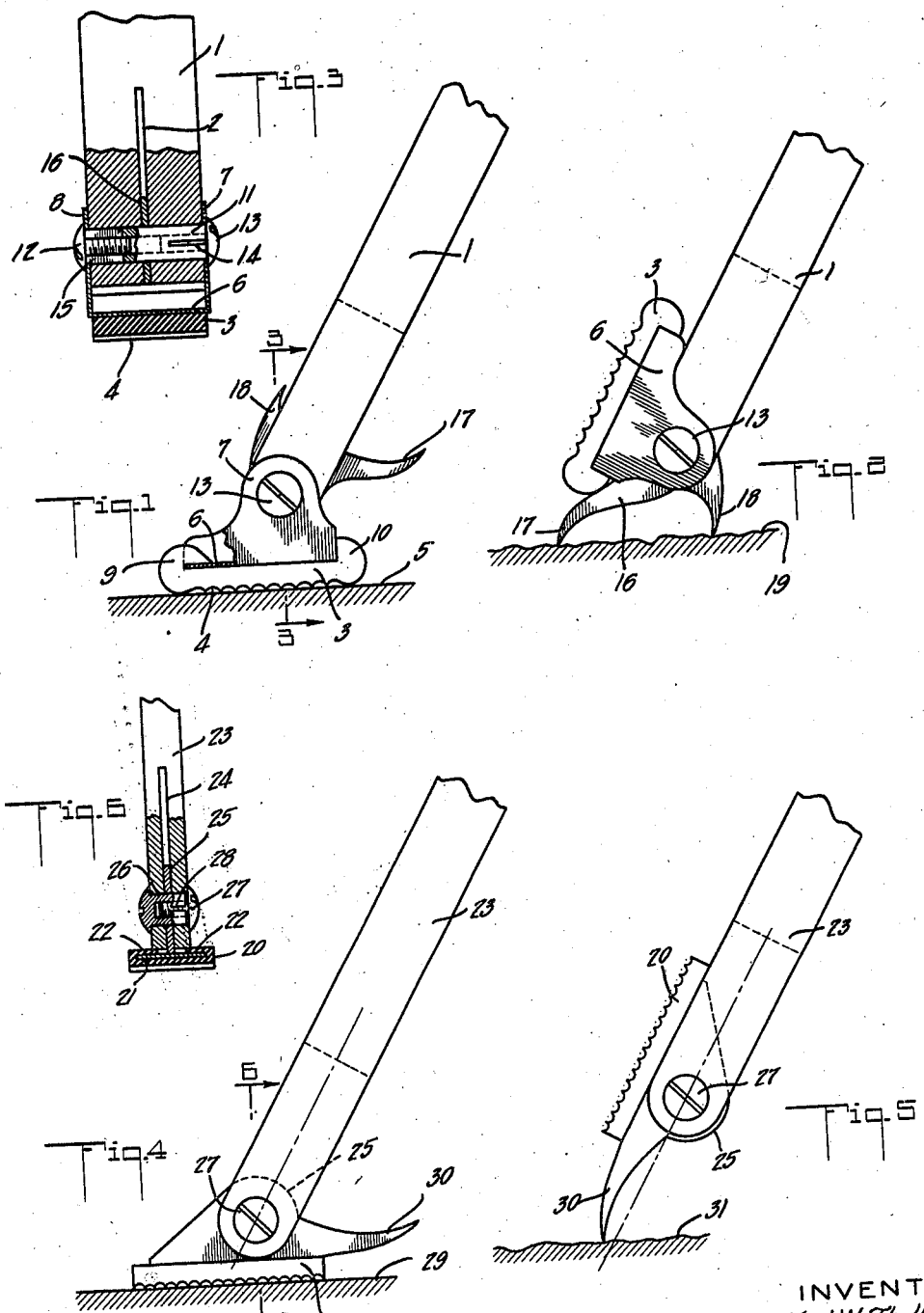
INVENTOR
Karl W. Thalhammer
BY John Flam
ATTORNEY Patented Mar. 31, 1942

2,277,939

UNITED STATES PATENT OFFICE 2,277,939

LEG REST

Karl W. Thalhammer, Los Angeles, Calif., assignor to Thomas W. Sukumlyn, Los Angeles, Calif.

Application August 7, 1939, Serial No. 288,737

3 Claims. (Cl. 248—193)

This invention relates to leg rests, such as for tripods, ladders, or the like.

It has been common to provide the ends of the tripod legs with surface engaging elements that ensure against slipping. When smooth surfaces such as polished wood are encountered, friction pads, as of rubber, may be used; and when for example, the tripod is intended to be supported on fabric, such as carpeting, sharp points may be utilized. Often the lower section of the leg is made reversible and arranged at opposite ends with sharp points and friction pads.

It is one of the objects of this invention to provide a leg rest at the tip of the leg that can be optionally adjusted to provide either a friction pad or a sharp point.

It is another object of this invention to improve and simplify leg rests.

This invention possesses many other advantages, and has other objects which may be made more easily apparent from a consideration of several embodiments of the invention. For this purpose there are shown a few forms in the drawing accompanying and forming part of the present specification. These forms, which illustrate the general principles of the invention, will now be described in detail; but it is to be understood that this detailed description is not to be taken in a limiting sense, since the scope of the invention is best defined by the appended claims.

Referring to the drawing:

Figure 1 is a side elevation of a leg extremity with a leg rest, incorporating the invention, supported thereon; the rest being arranged to utilize a friction pad;

Fig. 2 is a view similar to Fig. 1 but showing the pointed leg rest in use instead of the friction pad;

Fig. 3 is a sectional view taken along plane 3—3 of Fig. 1;

Fig. 4 is a side elevation of a leg extremity incorporating another form of the invention, shown as using a friction pad rest;

Fig. 5 is a view similar to Fig. 4 but illustrating the use of the pointed leg rest; and Fig. 6 is a sectional view taken along the plane 6—6 of Fig. 4.

The leg 1 in the form of the invention illustrated in Figs. 1, 2 and 3 may be that of a tripod or the like, and may conveniently be made of any appropriate material, such as wood or metal. Pivotally mounted upon the extremity of the leg 1 is a structure adapted to form optionally a friction pad rest or a pointed rest. The friction pad rest is formed in this instance by a pad 3 which may be of soft rubber or the like and provided with corrugations 4. These corrugations 4 are adapted to rest upon the plane or smooth supporting surface 5.

The friction pad 3 is shown as being supported by a sheet metal plate member 6 having ears 7 and 8 at its opposite sides, and pivotally mounted in a manner to be hereinafter described upon the end of the leg 1. Thus for example, the pad 3 may be provided with slotted enlarged ends 9 and 10, forming transverse flanges adapted to be slipped over the opposite edges of the plate support 6.

The ears 7 and 8 are shown as in contact with opposite side surfaces of the leg 1. Through these ears passes a pivot sleeve 11 (Fig. 3). This pivot sleeve 11 also extends across the central slot 2 formed in the bottom of the leg 1. This slot extends for a considerable distance above the extremity of the leg. The sleeve 11 is shown as threaded at each extremity for the accommodation of the attaching screws 12 and 13, which pass through appropriate apertures in the ears 7 and 8. In order to ensure that the screws 12 and 13 will be maintained within the sleeve 11 against accidental loosening, provisions are made for frictionally gripping these screws by the sleeve. Thus the sleeve 11 is slotted at each end; at the right hand end the slot 14 extending entirely across the sleeve 11 is indicated as being arranged in horizontal position. The slot 15 at the left hand end of the sleeve 11 is shown as in a vertical position. By appropriate compression of the slotted ends of the sleeve 11 before threading the screws 12 and 13 therein, a frictional grip is secured upon the threads of these screws.

Furthermore, these screws are tightened sufficiently to provide some frictional restraint against angular movement of the member 6.

By the aid of this structure the support 6 can be adjusted angularly about the axis of the sleeve 11 in order that the corrugated bottom of the pad 3 may contact the supporting surface 5. As shown most clearly in Fig. 1, the pad 3 is so arranged that the left hand portion extends further beyond the vertical plane passing through the axis of the sleeve 11 than the right hand portion thereof.

The pad 3 may be swung angularly in a clockwise direction so as to place it out of operative position with respect to the supporting surface 5. In its place a pointed leg rest 16 may be brought into the operative position of Fig. 3. This pointed leg rest is formed of thin sheet metal pivoted on the sleeve 11 and in the slot 2. The screws 12 and 13 compress the bifurcated end of the leg 1 so as frictionally to engage the sides of this member 16. This member 16 is provided with the spaced points 17 and 18 which are adapted to contact with a supporting surface 19. This surface may be a carpet, rug, or other soft material that would not serve effectively for a support for the friction pad 3. When the friction pad 3 is in use as in the position of Fig. 1, the pointed rest 16 can be swung upwardly to the position indicated in that figure, and into the slot 2.

By the aid of this structure, it is possible for the user of the tripod, ladder or other device, to adjust angularly the position of either of the two leg rests 3 or 16 to cooperate with the particular surface upon which the leg is to rest. In this form of the invention, the leg rests 3 and 16 are independently angularly adjustable about the axis of the sleeve 11.

In the simpler form of the invention illustrated in Figs. 4, 5 and 6, a soft rubber friction pad 20 is shown as mounted upon a sheet metal supporting plate 21 (Fig. 6). This is accomplished by providing the pad 20 with overlapping longitudinal flanges 22 which embrace the longitudinal edges of the plate 21.

The leg 23 in this instance is also provided with a longitudinal slot 24 of considerable depth. Within this slot is accommodated a central ear 25 which passes into the slot 24 and which is joined to the plate 21 for supporting it. The ear 25 is shown as pivotally mounted upon a headed hollow sleeve 26 passing across the slot 24 and internally threaded. A screw 27 engages the internal threads. The right hand end of the sleeve 26 may be slotted as indicated at 28 to provide a frictional grip upon the threads of the screw 27. The screw 27 may be turned in to a sufficient extent to cause frictional gripping of the ear 25 by the walls of the slot 24, which are compressed by this fastening means.

In the position of Fig. 4, the friction pad 20 is shown as resting upon the smooth supporting surface 29. However, if desired, a spur 30 formed integrally with the ear 25 may serve as a pointed rest for the leg. The spur or point 30 projects rearwardly of the ear 25 and out of contact with the supporting surface 29 when the pad 20 is in operative position. By turning the ear and the pad 20 supported thereon in a clockwise direction to the position of Fig. 5, the spur 30 is rendered operative. It may then serve to contact the supporting surface 31 which may be of the fabric type.

What is claimed is:

1. In a rest adapted to cooperate with the extremity of a supporting leg, means forming a pivotal support, a friction pad pivotally mounted on the support, and a pointed support independently adjustable about the pivotal support.

2. In a rest adapted to cooperate with the extremity of a supporting leg, means forming a pivotal support, a member having ears adapted to be placed on opposite sides of the leg and angularly adjustable about the support, said member having a plate joining the ears, and a friction member supported on the plate.

3. In a rest adapted to cooperate with a slotted extremity of a supporting leg, means forming a pivotal support extending across the slot, a frictional member having ears adapted to be placed on opposite sides of the leg and angularly adjustable about the support, and a pointed rest having a projection disposed in the slot and angularly adjustable about the pivotal support.

KARL W. THALHAMMER.